Patented Aug. 1, 1950

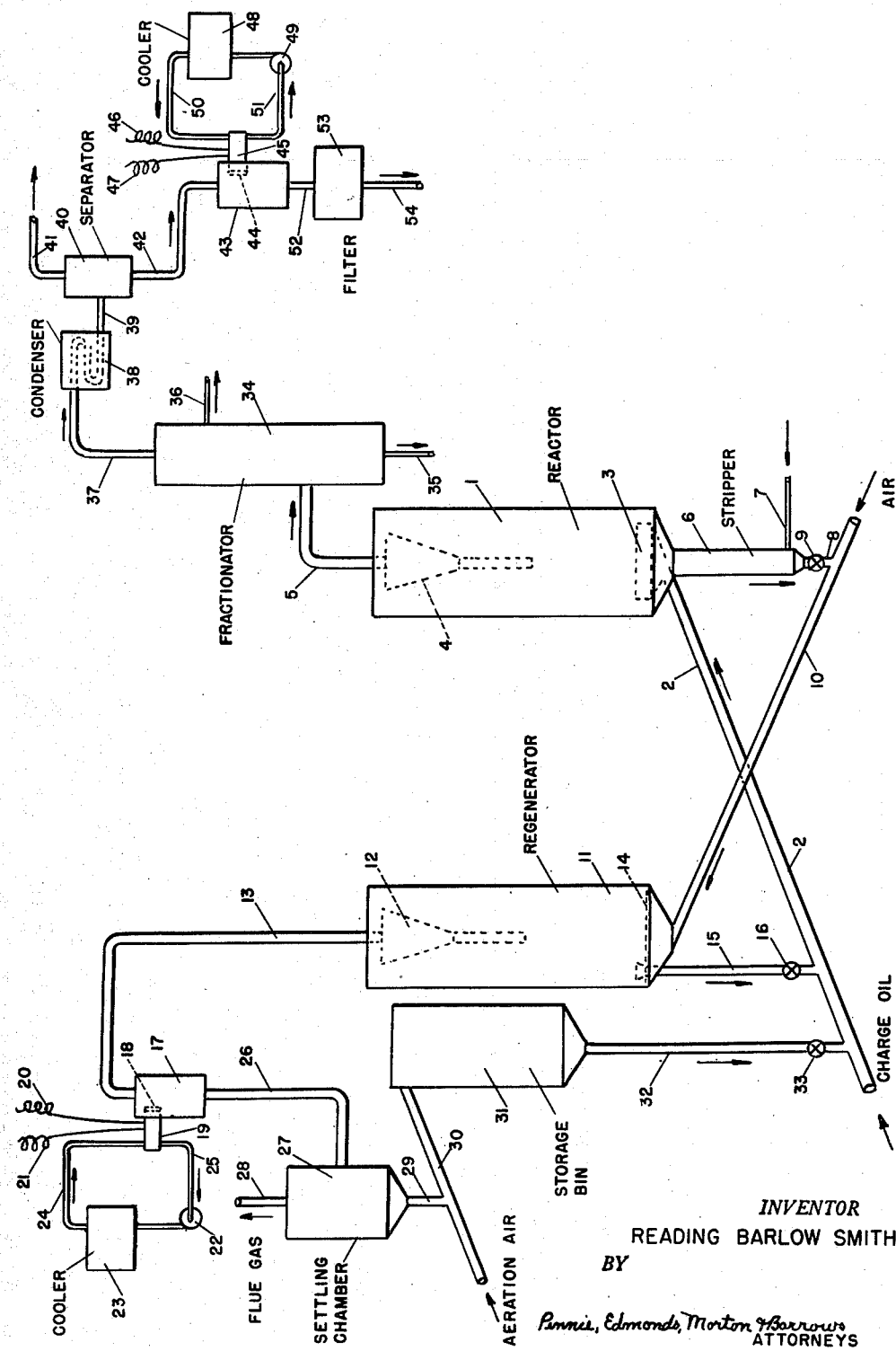

2,517,140

UNITED STATES PATENT OFFICE 2,517,140

PYROLYTIC CONVERSION OF HYDROCARBONS

Reading Barlow Smith, Hammond, Ind., assignor to Sinclair Refining Company, New York, N. Y., a corporation of Maine Application April 29, 1947, Serial No. 744,660

4 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst, at elevated temperature, is suspended in oil vapors, passed to a reaction zone in which conversion of the oil occurs and in which spent catalyst is separated from the oil vapors, the separated catalyst stripped of oil, regenerated by burning off coke or carbon deposited thereon, and the regenerated catalyst again suspended in the stream of oil vapors passing to the reaction zone. Operations of the type described are commonly designated fluid catalyst processes.

In conventional operation, the spent catalyst normally passes from the bottom of the reactor through a stripping column extending downwardly from the lower end of the reactor and in which the catalyst is contacted with steam for the purpose of removing, or stripping, from the catalyst vaporizable hydrocarbons remaining thereon. The stripped catalyst passes from the bottom of the stripper and is picked up by a stream of air and conveyed thereby into the bottom of the regenerator in which the catalyst, at elevated temperature, is intimately contacted with air, or other oxidizing gases, whereby carbonaceous deposits are burned off, and the regenerated catalyst is withdrawn from the regenerating zone and returned to the reactor.

Hydrocarbon vapors, product of the conversion, pass from the upper portion of the reaction zone through a cyclone separator for the separation of larger suspended catalyst particles, and from thence to a fractionator in which insufficiently converted hydrocarbons are separated from the desired product.

In operations of this type, there is usually present in the catalyst, largely as a result of attrition of the catalyst during its repeated cycling through the system, extremely finely divided particles, or so-called fines, which are carried off from the reaction zone in suspension in the effluent hydrocarbon vapors. These finely divided particles of catalyst are extremely resistant to conventional methods of separation and even persist in the product which has undergone fractionation and condensation.

In gasoline, for instance, the presence of finely divided solids is extremely objectionable because of their tendency to form engine deposits in internal combustion engines in which the gasoline is customarily used.

In my copending application Ser. No. 744,659, filed concurrently herewith, I have described and claimed an improved method of separating such fines from the effluent gases from the regenerator according to which the gaseous suspension is subjected to ultra-sonic vibrations by which the fines are caused to agglomerate and the agglomerates are separated as by settling and returned to the system.

My present invention provides an improved process whereby residual finely divided particles of catalyst may be effectively separated from the liquid hydrocarbon products of fluid catalyst conversion operations, which comprises the step of subjecting the product having the finely divided catalyst suspended therein, and in liquid phase, to ultra-sonic vibrations of the order of about one-half megacycle per second whereby the finely divided catalyst dispersed in the liquid is caused to coagulate to such an extent that it is readily separable from the product as by gravity settling or by conventional filtration.

The coagulation of the catalyst particles may be effected batch-wise or continuously. In batch treatment, a portion of the gasoline product, for instance, containing residual suspended catalyst, is charged into a vessel in which there is in contact with the liquid gasoline a diaphragm, adapted to ultra-sonic vibration, forming a partition between the gasoline chamber and a chamber containing a liquid in which there is submerged a piezoelectric crystal of quartz, for instance, excited in the known manner by high frequency electrical impulses.

In continuous operation, the gasoline is continuously passed through such a chamber in contact with a diaphragm or diaphragms such as just described. The crystal will normally be protected from temperature rise by continuously circulating the liquid from the chamber in which the crystal is submerged through cooling means and back to the chamber.

The treatment of the gasoline, for instance, for the separation of finely divided catalyst therefrom, is, with advantage, carried on continuously in conjunction with the catalytic conversion operation. The invention, accordingly, provides an improved process adapted to continuous operation and comprising a plurality of cooperating steps so coordinated as to constitute a unitary operation in which a charge of catalyst is repeatedly used and intermittently regenerated and returned to the conversion zone and in which the conversion product is attained substantially free from catalyst particles.

The present invention is used with particular advantage in conjunction with the invention of my previously referred to copending application in which catalyst fines are separated from the effluent gases from the regenerating operation and returned to the fluid catalyst cycle. In conventional operation, a considerable proportion of catalyst fines are normally carried from the system in suspension in the flue gases. Where the fines are recovered and returned to the cycle as there described, there is a greater tendency toward the accumulation of the catalyst fines in the cycle and contamination of the fractions of the converted hydrocarbons thereby. By the joint use of the recovery of the fines from the flue gases, substantial economy is effected while avoiding the presence of catalyst fines in the finished product.

The invention will be further described and illustrated with reference to the accompanying drawing which represents, conventionally and somewhat diagrammatically, a flow diagram of a fluid catalyst cracking operation embodying my invention.

Referring more particularly to the embodiment of the invention shown in the drawing, the apparatus indicated by the reference numeral 1, represents a generally cylindrical reactor of conventional type. The finely divided catalyst suspended in oil vapors enters the reactor through conduit 2 extending into the reactor and terminating in a conical member 3 of somewhat smaller maximum diameter than the reactor and opening upwardly into the reactor through a conventional grid, not shown.

As the hot vapors pass upwardly through the reactor there is a tendency for the catalyst to drop out of suspension forming a so-called "dense phase," or "high density," body of catalyst in the reactor, from which the catalyst flows downwardly through the annular space between the member 3 and the walls of the reactor.

Oil vapors, products of the conversion, rise to the top of the reactor, pass through a cyclone type separator 4 for the removal of larger particles of suspended catalyst from the vapors, the latter passing therefrom through conduit 5 and the separated catalyst is returned to the "dense phase" body of catalyst in the reactor.

Spent catalyst is withdrawn from the bottom of the reactor into the upper end of stripper 6 and passes downwardly therethrough in contact with steam or other gaseous stripping medium introduced into the bottom of the stripper through line 7. Stripped catalyst passes from the bottom of the stripper through conduit 8, in which there is interposed valve 9, and flows into conduit 10 wherein it is picked up by a current of air or other oxidizing gas and carried upwardly into the regenerator 11.

In the regenerator, carbonaceous deposits are burned off from the catalyst by contact with the air or other oxidizing gas introduced through conduit 10, the products of combustion passing from the upper portion of the regenerator through cyclone type separator 12, for the separation of the larger particles of suspended catalyst, and from which the products of combustion pass through conduit 13, the separated catalyst being returned to the dense phase body of catalyst in the regenerator.

Regenerated catalyst is withdrawn from the bottom of the regenerator from a zone above the grid 14 through regenerated catalyst leg 15, in which there is interposed a valve 16, advantageously a conventional slide valve, for the control of the flow of catalyst therethrough into the lower end of conduit 2 where it is picked up by a stream of preheated charge oil passing to the reactor.

Flue gases passing from the regenerator through conduit 13, carrying catalyst fines in suspension, are passed through chamber 17 in which they are subjected to ultra-sonic vibration transmitted to the suspension through diaphragm 18 forming a partition between chamber 17 and the contiguous chamber 19 in which there is a piezo-crystal adapted to be excited, in the conventional manner, by high frequency electrical impulses transmitted to the crystal through electrical connections 20 and 21.

The crystal is submerged in a liquid, oil, for instance, and is protected from temperature rise, due to heat transmitted through the diaphragm, by continuously circulating the liquid cooling medium, through the chamber 19 by means of pump 22, cooler 23, and connections 24 and 25. The cooling liquid also serves as a medium for transmitting the vibrations of the crystal to the diaphragm.

Flue gases, together with agglomerates of catalyst fines, pass from chamber 17 through conduit 26 to enlarged settling chamber 27 from which the flue gases pass through conduit 28 to a stack, not shown, and the separated catalyst passes through conduit 29 to an elevator conduit 30 wherein it is picked up by a current of aeration air and carried up into storage bin 31 from which it flows in a fluidized state through leg 32 into the lower end of conduit 2 where it is picked up by the stream of hydrocarbon charge oil and carried into the reactor, together with catalyst from the regenerator. The flow of catalyst through leg 32 is regulated and controlled by valve 33.

Hydrocarbon vapors, products of the conversion, and carrying catalyst fines in suspension pass through line 5 to a fractionator 34 of conventional type, from which unvaporized heavy hydrocarbons are withdrawn through line 35, an intermediate product is withdrawn through line 36 and the light hydrocarbons containing the desired product are withdrawn through line 37. The lighter hydrocarbons are passed through condenser 38 and, from thence, through line 39 to separator 40 from which the lighter uncondensed hydrocarbons are withdrawn through line 41 and the condensate is withdrawn through line 42.

As previously noted, the condensate withdrawn from the separator frequently contains catalyst fines not readily separable therefrom by ordinary filtration means. The condensate is passed through chamber 43 in which it is subjected to ultra-sonic vibrations transmitted to the suspension through diaphragm 44, forming a partition between the chamber 43 and the contiguous chamber 45, in which there is a piezo-crystal, not shown, adapted to be excited in the conventional manner by high frequency electrical impulses transmitted to the crystal through electrical connections 46 and 47.

This crystal is likewise submerged in a liquid medium, oil, for instance, adapted to transmit the vibrations of the crystal to the diaphragm. For the purpose of maintaining the crystal at an efficient operating temperature, the liquid medium may be circulated through chamber 45 and cooler 48 by means of pump 49 and connections 50 and 51.

As a result of the ultra-sonic vibration of the liquid suspension in chamber 43, the catalyst fines therein are caused to coagulate, forming agglomerates of such size and character that they may be separated in the conventional manner. The gasoline, for instance, having agglomerates suspended therein, is passed by line 52 from chamber 43 through a conventional filter 53 and, from thence, through line 54 to storage or further treatment. Instead of a filter, other conventional separating means may be used, centrifugal separation may be employed with advantage.

For simplicity, I have shown a single vibrating diaphragm in the chambers 17 and 43, respectively. It will be understood, however, that a plurality of such diaphragms may be employed and are usually desirable. Advantageously, I employ in each of these chambers a plurality of diaphragms so designed and operated as to impart to the respective suspensions passing therethrough, vibratory energy equivalent to about 250 acoustical watts per cubic foot of volume of the chamber.

As previously noted, the ultra-sonic coagulation of the catalyst fines in the liquid product is used, with particular advantage, in conjunction with the ultra-sonic agglomeration of the catalyst fines in the flue gases. However, the agglomeration of fines in the gasoline product may be used, with advantage, either with or without the separation and return to the system of fines normally present in the flue gases.

It will be understood that the herein described method of separating fines from the liquid fraction may also be used, with advantage, in the treatment of liquid fractions other than that containing the desired product.

It will also be understood that the utility of the present invention is not restricted to the particular embodiment thereof herein described, but is applicable to various modifications of fluid catalyst processes in which catalyst fines are carried off in suspension in effluent vapors from the fluid catalyst reactor.

The catalyst employed may be of the type conventionally used in fluid catalyst processes, for instance, a silica-alumina type catalyst in finely divided, or powdered, form. The reaction conditions may likewise be those conventionally used in operations of this type and, as understood in the art, the optimum temperatures and pressures employed will depend primarily upon the type of feed stock used, the particular catalyst employed and the reaction desired.

In cracking gas oil, for instance, the reaction temperature may, with advantage, be within the range of 800–1,000° F. and the pressure at the top of the reactor within the range of about 5 to 25 pounds per square inch. The regeneration temperature may be within the range of 950 to 1,200° F., heat for the reaction being supplied in large measure by the hot catalyst passing into the the charge oil from the regenerator.

The invention is not restricted to the particular means shown for generating the ultra-sonic vibrations or imparting the vibrations to the suspensions but contemplates other known means for imparting energy in the form of ultra-sonic vibrations to the respective suspensions. Further, ultra-sonic vibrations varying somewhat from the specific frequency given may be used without departing from the spirit of the invention and may be more or less effective in coagulating catalyst fines of some types.

I claim:

1. In a fluid catalyst process for the conversion of hydrocarbons in which hydrocarbon vapors at an elevated temperature are intimately contacted with a finely divided catalyst in a reaction zone, converted hydrocarbon vapors pass from the reaction zone and are fractionated to form a non-residual liquid fraction which contains catalyst fines in suspension, the step of coagulating residual catalyst fines in the non-residual liquid fraction by subjecting the fraction to ultra-sonic vibrations of the order of one-half megacycle per second.

2. In a fluid catalyst process for the conversion of hydrocarbons in which hydrocarbon vapors at an elevated temperature are intimately contacted with a finely divided catalyst in a reaction zone, converted hydrocarbon vapors pass from the reaction zone and are fractionated to form a non-residual liquid fraction which contains catalyst fines in suspension, the step of removing residual catalyst fines from the non-residual liquid fraction which comprises subjecting the fraction to ultra-sonic vibrations of the order of one-half megacycle per second, whereby the catalyst fines are agglomerated and separating the agglomerates of catalyst fines from the liquid fraction by filtration.

3. In a fluid catalyst process for the conversion of hydrocarbons in which hydrocarbon vapors at an elevated temperature are intimately contacted with a finely divided catalyst in a reaction zone, converted hydrocarbon vapors pass from the reaction zone and are fractionated to form a non-residual liquid fraction which contains catalyst fines in suspension, the step of removing catalyst fines from the non-residual liquid fraction which comprises passing the suspension through a confined zone, subjecting the suspension therein to ultrasonic vibrations of a frequency of the order of one-half megacycle per second and of an intensity equivalent to 250 acoustical watts per cubic foot, whereby the catalyst fines are agglomerated, and separating the agglomerates of catalyst fines from the liquid fraction by filtration.

4. In a fluid catalyst process for the conversion of hydrocarbons in which hydrocarbon vapors at an elevated temperature are intimately contacted with a finely divided catalyst in a reaction zone, converted hydrocarbon vapors pass from the reaction zone and are fractionated to form a non-residual liquid fraction containing catalyst fines in suspension. Spent catalyst is intermittently regenerated by burning off the carbonaceous material deposited thereon in a regenerating zone and catalyst fines are carried off in suspension in the flue gases from the regenerating zone, the improvement which comprises passing the flue gas suspension through a confined zone and subjecting it therein to ultra-sonic vibrations of a frequency of the order of one-half megacycle per second and of an intensity equivalent to 250 acoustical watts per cubic foot, whereby the catalyst fines are agglomerated, separating the agglomerates of catalyst fines from the gases and returning the separated fines to the reaction zone, subjecting the non-residual liquid fraction from the fractionation to ultra-sonic vibrations of a frequency of the order of one-half megacycle per second and of an intensity equivalent to 250 acoustical watts per cubic foot, whereby the catalyst fines are agglomerated and filtering the agglomerates of catalyst fines from the liquid fraction.

READING BARLOW SMITH.

REFERENCES CITED

The following references are of record in the file of this patent:

UNITED STATES PATENTS

| Number | Name | Date |
| --- | --- | --- |
| 2,315,734 | Ralston et al. | Apr. 6, 1943 |
| 2,393,554 | Ogorzaly | Jan. 22, 1946 |
| 2,407,371 | Jahnig | Sept. 10, 1946 |

FOREIGN PATENTS

| Number | Country | Date |
| --- | --- | --- |
| 500,271 | Great Britain | 1939 |
| 508,675 | Great Britain | June 26, 1939 |

OTHER REFERENCES

Sollner et al., "The Mechanism of Coagulation by Ultrasonic Waves," Trans. Faraday Soc. 32, 616–623 (1936).

Bergmann, "Ultrasonics," pp. 212–216, John Wiley and Sons (1938).